United States Patent Office 3,598,612
Patented Aug. 10, 1971

3,598,612
METHOD OF IMPROVING COLOR OF
COOKED EGG PRODUCTS
Wesu Ng, St. Louis, Mo., assignor to The Ralston
Purina Company, St. Louis, Mo.
No Drawing. Filed Dec. 19, 1968, Ser. No. 785,354
Int. Cl. A23l 1/32
U.S. Cl. 99—113
11 Claims

ABSTRACT OF THE DISCLOSURE

A method for producing cooked egg products which comprise treating egg yolks with minor amounts of an edible oxidizing agent and subsequently formulating said yolk into a finished cooked egg product wherein the yolk is surrounded by coagulated egg whites. The particular treatment of the egg yolk substantially eliminates or substantially reduces the characteristic gray or green discoloration which is customarily present at the yolk-white interface of cooked egg products.

BACKGROUND OF THE INVENTION

It is well known that hard boiled eggs develop a typical gray or green discoloration in the area of the interface of the yolk and white. In the situations where it is desirable to slice the whole egg or separate the yolk from the white, the discoloration on either or both the yolk and the white is quite unattractive and unappetizing. Such discoloration is also present in commercially prepared egg products wherein the yolk material is surrounded by egg white. Efforts have been made to minimize discoloration in similar commercial egg products by the use of compounds such as calcium disodium EDTA in the yolk; however, such efforts have not been successful in significantly reducing the discoloration.

SUMMARY OF THE INVENTION

It has now been discovered that the characteristic discoloration existing at the yolk-white interface of cooked egg products can be substantially eliminated by subjecting the raw yolks to specific treatment under controlled conditions.

In accordance with the present invention, an egg product having improved color characteristics is accomplished in a method which comprises the steps of separating raw egg yolks and whites and subsequently treating said yolks, raw or cooked, with a minor amount of an edible oxidizing agent. The treated yolk may then be surrounded by egg white and further processed to produce a commercially acceptable cooked egg product.

PREFERRED EMBODIMENT OF THE INVENTION

It is the purpose of the present invention to treat raw or cooked egg yolks in a particular manner in order that such yolks may be formulated into subsequent cooked egg products and the particular treatment of the yolk provides a means of eliminating the characteristic discoloration at the yolk-white interface.

It has been found that treating the yolks with a minor amount of an edible oxidizing agent produces the desirable result of the present invention. Oxidizing agents that may be employed in the present invention include any edible compounds that yield hydrogen peroxide. Examples include the percarbonates, pernitrates, perbenzoates, peranhydrides, peracids, fatty peroxides and the like. However, the use of hydrogen peroxide is preferred.

In a preferred embodiment of the present invention liquid egg yolks are combined with a minor amount of a proteolytic enzyme. The enzyme serves to hydrolyze the protein that is present and provides for a smoother texture in the cooked yolk product. The enzyme is reacted with the yolk for a short period of time. The enzyme should be present in the yolk in an amount from about 0.001% by weight to about 1% by weight and preferably from about 0.01% by weight to about 0.03% by weight based on the weight of the yolk. After a sufficient time for reaction between the enzyme and protein and lipo protein of the yolk, the yolk is coagulated at elevated temperatures in a casing or mold of desirable shape. The yolk is removed from the mold or casing and subsequently passed through or immersed in a solution containing a minor amount of an edible oxidizing agent such as hydrogen peroxide. The concentration of the edible oxidizing agent in the solution is in the range of from about 0.1% to about 10% and preferably from about 1% to about 5% based on the total weight of the solution. It is to be understood that the time of exposure of the egg yolk to the solution will be dependent upon the concentration of the solution. The oxidizing agent may also be sprayed onto the outer surface of the yolk to obtain the desired result of the invention. The yolk is then rinsed to remove the excess peroxide solution, surrounded by egg whites and subsequently processed into a cooked egg product. It is to be further understood that the use of the proteolytic enzyme is only necessary where it is desirable to obtain the particular smooth texture yolk which is obtained from such treatment.

In another method of the invention, the raw liquid egg yolks are combined with a minor proportion of the above described concentrations of proteolytic enzyme. After a sufficient time for reaction between the enzyme and the protein and lipo protein of the yolk, a minor amount of an edible oxidizing agent such as hydrogen peroxide is added to the yolk mixture. Although it is not fully understood what specific reaction produces the desired result, the addition of oxidizing agent such as hydrogen peroxide to egg yolks has been found to produce highly desirable results in eliminating the characteristic color in the area of the egg product hereinbefore described. Such oxidizing agent is present in the yolk in an amount from about 0.001% by weight to about 1.0% by weight and preferably from about 0.02% by weight to about 0.05% by weight based on the weight of the yolk. The treated yolk is then placed into a mold or casing and heated at elevated temperatures sufficient to coagulate the yolk and also inactivate the enzyme. The yolk is cooled, removed from the casing or mold and subsequently processed in a manner such that coagulated egg whites surround the coagulated yolk to produce a finished egg product. Although the above described procedure produces the most desirable product of the invention, it is to be understood that products may be prepared wherein the addition of the enzyme is unnecessary and, therefore, only the hydrogen peroxide treatment of the egg yolk is required.

The proteolytic enzymes that may be employed in the present invention are typically those types of enzymes that will substantially hydrolyze the protein and lipo protein present in the yolk to which it has been added. Examples of such enzymes include papain, bromelin, pepsin, trypsin, and the like. The enzyme employed has a strength of about 6,000 hemoglobin units per gram of the enzyme material. The liquid yolks and whites of the invention are heated during the process to elevated temperatures sufficient to cause said yolks and whites to coagulate and also to inactivate any proteolytic enzymes which may be employed in the process. Such temperatures are found to be in the range of from about 180° F. to about 212° F.

It has been found that other methods may be employed to cook the egg yolks to prepare them for processing into the egg products of the invention. One such process comprises the steps of (1) mixing together raw egg yolks and an appropriate proteolytic enzyme, (2) subjecting the mixture to heat and pressure sufficient to both partially coagulate the yolk and inactivate the enzyme, (3) placing the resulting yolk in a mold, (4) subjecting the yolk mixture to additional heat to completely coagulate the yolk and cooling the final yolk product. The edible oxidizing agent may be mixed into the raw yolk mixture in step (1) above subsequent to the addition of the enzyme or the yolk product obtained as the result of step (4) may be contacted with, e.g., dipped or sprayed, a solution containing an appropriate, edible, oxidizing agent, said agent and concentrations being hereinbefore described. It is understood, however, that the raw egg yolks may be prepared under controlled conditions without the presence of a proteolytic enzyme.

The particular heat and pressure as described in step (2) above is preferably accomplished in an apparatus commonly called a jet cooker, wherein the egg yolk mixture of step (1) is subjected to steam heat under pressure in said apparatus.

The resulting egg product produced in accordance with the method of the present invention shows substantially improved color properties in that there are no visible signs of the characteristic discoloration in the area of yolk-white interface. The product is, therefore, quite appealing and attractive when used in typical dinner menu preparations.

The following examples are illustrative of the invention and are not intended to limit the scope thereof.

EXAMPLE 1

The whites and yolks from 72 fresh, cool eggs were separated and placed into individual containers. Into the yolk portion, weighing 1,000 grams, was added 4 ml. of a 5% solution of papain (0.02% by weight based on weight of yolk). The papain was reacted with the yolk for about 20–50 minutes. To the egg yolk was admixed 10 ml. of a 5% hydrogen peroxide solution (0.05% by weight based on weight of the yolk). The treated yolk was placed into a standard sausage casing 20 mm. in diameter and closed at both ends. The casing was placed into hot water at a temperature of about 200° F. for about 25 minutes. The casing was then removed from the hot water and placed in cold water until the temperature of the yolk was about 70° F., the casing being subsequently removed from around the yolk.

About a 12¾ inch (150 gm.) length of the solid cooked yolk as provided above was placed into a second sausage casing about 45 mm. in diameter. The casing contained about 350 grams of raw liquid egg white and completely surrounded the solid egg yolk. The casing being closed at both ends was placed into hot water at a temperature of about 200° F. for about 20 minutes. The resulting cooked egg roll product was removed from the hot water, placed in cold water until the temperature of the entire product was about 70° F.

The cooked egg product was placed in a refrigerator at about 50° F. for 72 hours to determine the amount of discoloration that would occur in the product. At the end of said period the product was removed, cut open and no discoloration was visible at the yolk-white interface.

For purposes of comparison, an egg roll product was prepared in accordance with the procedure as described above except that the oxidizing agent, hydrogen peroxide, was eliminated from the egg yolk. The resulting cooked product was stored at the same temperature for the same time period. Upon cutting the product to expose the area of characteristic discoloration, it was observed that the typical gray or green discoloration was present.

EXAMPLE 2

The method of Example 1 was substantially repeated except that hydrogen peroxide was not added to the raw egg yolk prior to coagulating at elevated temperatures. Instead, the coagulated egg yolk was subsequently dipped into a 1% hydrogen peroxide solution for a period of about 10 minutes and subsequently rinsed to rid the yolk of excess peroxide. The yolk was subsequently processed in accordance with Example 1 to obtain the resulting cooked egg product.

The product was subjected to the same temperatures for the same periods of time to determine the degree of discoloration. Upon cutting and observing the product, no discoloration was visible at the yolk-white interface.

EXAMPLE 3

The procedures of Example 1 were repeated except that the proteolytic enzyme was not added to the yolk. The resulting egg product had substantially the same color characteristics as that produced in Example 1.

EXAMPLE 4

The procedures of Example 2 were repeated except that the proteolytic enzyme was not added to the yolk. The resulting egg product had substantially the same color characteristics as that produced in Example 2.

In place of the particular enzyme and edible oxidizing agent employed in the examples, other enzymes and oxidizing agents may be employed in the invention as hereinbefore described to obtain substantially the same result.

What is claimed is:

1. A method of producing egg products having improved color properties which comprises the steps of: separating raw egg yolks from the egg whites, forming and coagulating the egg yolks into a yolk body, contacting the coagulated yolk body with a sufficient amount of an edible oxidizing agent to substantially prevent discoloration at the coagulated egg yolk and white interface and substantially surrounding the treated coagulated yolks with coagulated egg whites.

2. The method according to claim 1 wherein the coagulated egg yolk is contacted with an edible oxidizing agent by passing said yolk through an aqueous solution containing a minor amount of an edible oxidizing agent.

3. The method according to claim 2 wherein the edible oxidizing agent is hydrogen peroxide and is present in an amount from about 0.1% to about 10% by weight based on the total weight of the solution.

4. A method of producing egg products having improved color properties which comprises the steps of
   separating raw egg yolks from egg whites,
   placing the yolks into a first mold,
   heating said first mold to elevated temperatures to coagulate the yolk contained therein,
   cooling the mold and removing the coagulated yolk therefrom,
   treating the coagulated yolk with a sufficient amount of an edible oxidizing agent to substantially prevent discoloration at the coagulated egg yolk and egg white interface,
   placing the treated yolk into a second mold and surrounding said yolk with raw egg whites,
   heating said second mold to elevated temperatures to coagulate the egg white, and
   cooling said mold.

5. The method according to claim 4 wherein the raw egg yolks have admixed therein a proteolytic enzyme.

6. The method according to claim 5 wherein the proteolytic enzyme is papain.

7. The method according to claim 4 wherein the first and second molds are heated to temperatures of from about 180° F. to about 212° F.

8. The method according to claim 4 wherein the coagulated egg yolk is treated with an edible oxidizing agent by passing said yolk through an aqueous solution containing a minor amount of an edible oxidizing agent.

9. The method according to claim 8 wherein the edible oxidizing agent is hydrogen peroxide.

10. The method according to claim 8 wherein the edible oxidizing agent is present in an amount from about 0.1% to about 10% by weight based on the total weight of the solution.

11. The method according to claim 5 wherein the proteolytic enzyme is present in an amount from about 0.001% to about 1.0% by weight based on the weight of the egg yolk.

References Cited
UNITED STATES PATENTS

| | | | |
|---|---|---|---|
| 3,364,037 | 1/1968 | Mink et al. | 99—161 |
| 3,285,749 | 11/1966 | Shires | 99—113 |
| 3,028,245 | 4/1962 | Mink et al. | 99—113X |
| 1,870,269 | 8/1932 | Tressler | 99—113 |

JOSEPH M. GOLIAN, Primary Examiner

U.S. Cl. X.R.

99—161